(12) United States Patent
Ohtaka

(10) Patent No.: US 6,710,949 B2
(45) Date of Patent: Mar. 23, 2004

(54) TILTING DEVICE FOR LENS

(75) Inventor: Kouichi Ohtaka, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 10/447,995

(22) Filed: May 30, 2003

(65) Prior Publication Data

US 2003/0202261 A1 Oct. 30, 2003

Related U.S. Application Data

(63) Continuation of application No. 09/988,147, filed on Nov. 19, 2001, now Pat. No. 6,636,368.

(30) Foreign Application Priority Data

Nov. 22, 2000 (JP) ........................................ 2000-356639

(51) Int. Cl.[7] .............................................. G02B 07/02
(52) U.S. Cl. ........................ 359/822; 359/819; 359/824
(58) Field of Search ............................... 359/813, 814, 359/819, 822, 823, 824; 369/44.14

(56) References Cited

U.S. PATENT DOCUMENTS

| 4,385,373 A | 5/1983 | Howe ...................... 369/44.15 |
| 4,616,355 A | 10/1986 | Kasahara ................. 369/44.16 |
| 5,909,323 A | 6/1999 | Blake et al. ................ 359/814 |
| 6,191,897 B1 | 2/2001 | Blake et al. ................ 359/814 |

FOREIGN PATENT DOCUMENTS

| JP | 5-94628 | 4/1993 |
| JP | 2719974 | 11/1997 |
| JP | 2757539 | 3/1998 |

*Primary Examiner*—Ricky Mack
(74) *Attorney, Agent, or Firm*—Oblon, Spivak, McClelland, Maier & Neustadt, P.C.

(57) ABSTRACT

A first substrate is formed with a lens, a plurality of beams for supporting the lens, and a first electrode provided on the plurality of beams. A second substrate is formed with second electrodes at location opposed to the plurality of beams through gaps. A voltage control circuit applies voltage between the first electrodes formed on the plurality of beams and the second electrodes to apply the electrostatic force to the plurality of beams to generate bending, thereby changing a tilting direction of the lens.

40 Claims, 8 Drawing Sheets

TILTING DEVICE FOR LENS

FIELD OF THE INVENTION

The present invention relates to a tilting device for a lens, and more particularly, to a tilting device for a lens using an actuator which is suitable for a floating type optical head.

BACKGROUND OF THE INVENTION

As an actuator of a tilting mechanism for adjusting tracking of a pickup portion of an optical disk, a moving coil type motor using a moving coil, a permanent magnet and a magnetic material is mainly used (page 124 of "optical disk technique" published by Radio Gijyutu Co.).

For example, Japanese Patent No.2719974 discloses optical pickup using a magnetodynamic device. In the magnetodynamic device of the optical pickup shown in this publication, a magnet is mounted to a lens holder which is supported by a spring such that the holder can be displaced, and a magnetic yoke and a driving coil are provided on a fixed side of the magnet such as to be opposed to the magnet. In this magnetodynamic device, when the lens holder is displaced in its movable range, a value of $X=g/(b-a)$ is set such that a magnetic force applied to the lens holder is substantially proportional to the displacement distance, wherein a is a widthwise size in a direction in which the lens holder is displaced, b is a vertical size of the yoke, and g is a gap size between the magnet and the yoke.

Japanese Patent No. 2757539 discloses a tracking adjusting method of a floating type optical head using a relay lens. The floating type optical head in this publication comprises an object lens for converging laser beam into an optical disk, a slider for floating the object lens from a surface of the optical disk by a dynamic pressure air bearing effect to maintaining a distance between the object lens and the optical disk substantially constant, a movable portion which is driven along a radial direction of the optical disk by driving unit, and a stationary portion having a light source of the laser beam, detecting unit which detects a deviation amount between focusing and tracking, and focusing control unit which controls focusing based on a signal detected by the driving unit. This floating type optical head further comprises tracking control unit having a lens comprising a plurality of lenses for optically finely controlling tracking of the laser beam combined in the stationary portion, a signal separating circuit for separating signals corresponding to the deviation amount of the tracking output from the driving unit into a high frequency signal and a low frequency signal, a first drive control circuit for controlling the driving force of the driving unit based on the low frequency signal separated by the signal separating circuit, and a second drive control circuit for controlling the driving force which moves one of the relay lenses of the tracking control unit in a direction intersecting the optical axis at right angles.

Japanese Patent Application Laid-open No. 5-94628 discloses a method using a linear motor as an actuator for adjusting the tracking of the floating type optical head. An optical storing and reproducing apparatus of this publication comprises an object lens for converging laser beam into an optical disk, a slider for floating the object lens from a surface of the optical disk by a dynamic pressure air bearing effect to maintaining a distance between the object lens and the optical disk substantially constant, a movable portion which is driven along a radial direction of the optical disk by driving unit, and a stationary portion having a light source of the laser beam, detecting unit which detects a deviation amount between focusing and tracking, focusing control unit which controls focusing based on a signal detected by the driving unit, and tracking control unit which controls tracking based on a signal detected by the driving unit. This floating type optical head further comprises a lens for controlling the tracking by moving the lens in a direction intersecting the optical axis at right angles, this tracking control lens is supported by a resilient support member having high rigidity such that the lens can move in a direction intersecting the optical axis at right angles.

However, any of the moving coil-type actuator, the relay lens and the linear motor is heavy and is not suitable for the floating type optical head. Further, there is a problem that since the weight is heavy, an inertial force is great and a tilting motion of the lens for correcting the tracking at high speed can not be adjusted at high speed. Further, since a structure of the actuator itself is complicated, it is complicated to mount the head and assemble the same.

SUMMARY OF THE INVENTION

It is an object of the invention to provide a tilting device for a lens using an actuator which is suitable for a floating type optical head and which has a light and simple structure.

A first aspect of the present invention provides a tilting device for a lens for tilting a lens formed of optical material, comprising a plurality of beams for supporting the lens, and electrostatic force applying unit which applies electrostatic force to the plurality of beams, wherein the electrostatic force is applied to the plurality of beams to bend the beam, thereby tilting the lens. According to this aspect, the plurality of beams support the lens, the electrostatic force applying unit applies the electrostatic force to the plurality of beams, the electrostatic force applied to the plurality of beams tilts the lens, thereby changing the angle of the lens.

A second aspect of the present invention provides a tilting device for a lens according to the first aspect, wherein the number of the plurality of beams is three or more. According to this aspect, three or more beams are formed.

A third aspect of the present invention provides a tilting device for a lens according to the first or the second aspect, wherein the plurality of beams are formed helically. According to this aspect, the plurality of beams are formed helically.

A fourth aspect of the present invention provides a tilting device for a lens according to any one of the first to third aspects, wherein a portion of each of the plurality of beams is that supports the lens is formed narrower. According to this aspect, the portion of each of the plurality of beams is that supports the lens is formed narrower.

A fifth aspect of the present invention provides a tilting device for a lens according to any one of the first to fourth aspects, wherein a portion of each of the plurality of beams is that supports the lens is formed thinner. According to this aspect, the portion of each of the plurality of beams is that supports the lens is formed thinner.

A sixth aspect of the present invention provides a tilting device for a lens according to any one of the first to fifth aspects, wherein the electrostatic force applying unit comprises a first electrode formed on each the beam, a second electrode formed at a location opposed to each the beams through a gap, and voltage applying unit which applies voltage between the first electrode formed on the beam and the second electrode to apply the electrostatic force to the beam. According to this aspect, voltage applying unit applies voltage between the first electrode formed on the beam and the second electrode formed such as to be opposed to the first electrode through a gap to apply the electrostatic force to the beam.

A seventh aspect of the present invention provides a tilting device for a lens according to the sixth aspect, wherein the gaps are not parallel to each other. According to this aspect, the gaps are not parallel to each other.

An eighth aspect of the present invention provides a tilting device for a lens according to any one of the first to seventh aspects, wherein the lens and the plurality of beams are made of the same material. According to this aspect, the lens and the plurality of beams are made of the same material.

A ninth aspect of the present invention provides a tilting device for a lens according to any one of the sixth to eighth aspects, wherein the lens, the plurality of beams, a first substrate formed with the first electrode and a second substrate formed with the second electrode are connected to one another. According to this aspect, the lens, the plurality of beams, a first substrate formed with the first electrode and a second substrate formed with the second electrode are connected to one another.

A tenth aspect of the present invention provides a tilting device for a lens according to the ninth aspect, wherein the second substrate is a semiconductor material. According to this aspect, the second substrate is a semiconductor material.

An eleventh aspect of the present invention provides a tilting device for a lens according to the ninth or tenth aspects, wherein the second substrate is provided with the voltage applying unit. According to this aspect, the second substrate is provided with the voltage applying unit.

Other objects and features of this invention will become apparent from the following description with reference to the accompanying drawings.

DETAILED DESCRIPTION

Preferred embodiments of a tilting device for a lens according to the present invention will be explained with reference to the drawings in the order of first embodiment and second embodiment.

Figure 1A:
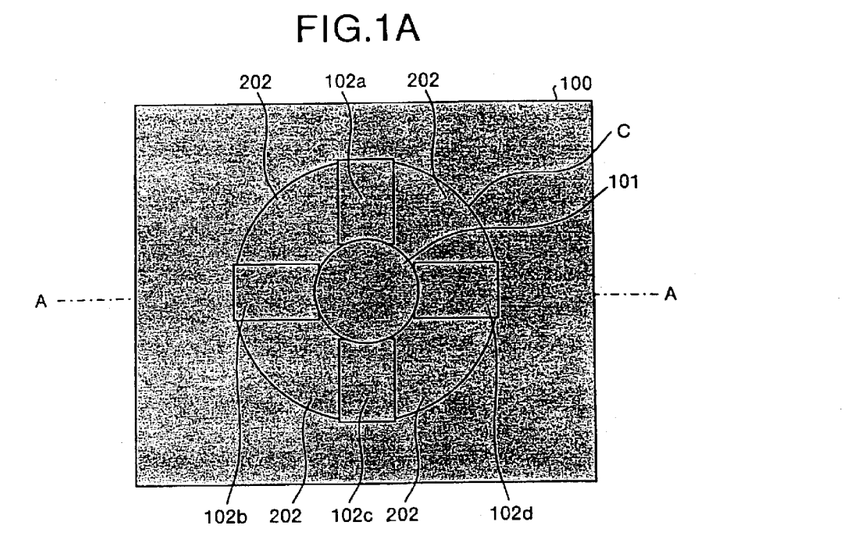
FIGS. 1A and 1B shows a schematic structure of a tilting device for a lens according to a first embodiment.
Figure 1B:
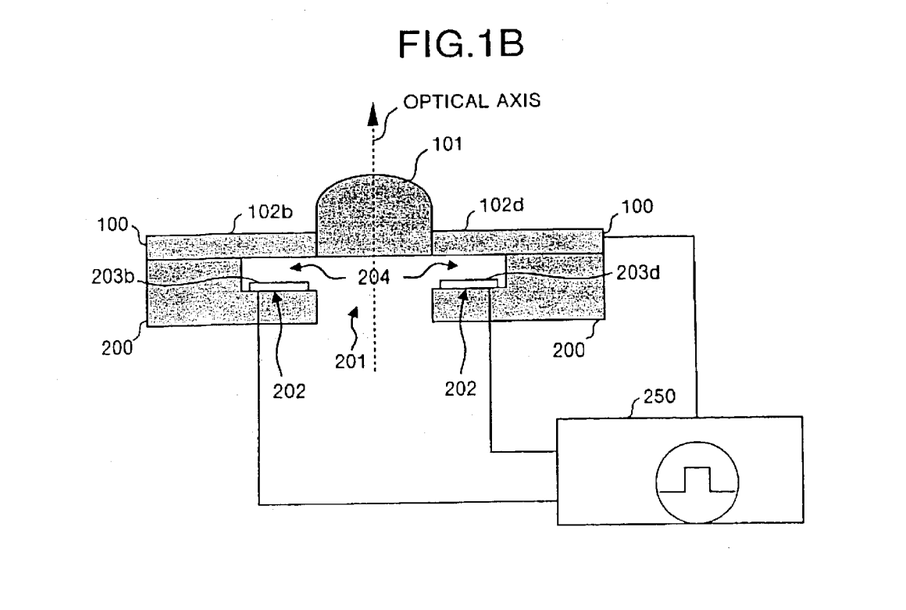

FIGS. 1A and 1B shows a schematic structure of a tilting device for a lens according to the first embodiment, wherein FIG. 1A is a plane view of the tilting device for the lens, and FIG. 1B is a sectional view taken along A—A line in FIG. 1A.

In FIGS. 1A and 1B, a reference numeral 100 represents a first substrate formed with four beams 102a to 102d. A reference numeral 101 represents a lens formed on a substantially central portion of the first substrate. The four beams 102a to 102d support the lens 101 from four directions along a predetermined circular c of the first substrate 100. Each of the four beams 102a to 102d is formed with an electrode (first electrode) which is not shown.

A reference numeral 200 represents a second substrate formed with an electrode and the like. A lower surface of the first substrate 110 and an upper surface of the second substrate 200 are connected to each other. The second substrate, 200 is formed with an opening 201 having substantially the same size as an inner periphery of the lens 101. Light enters the lens 101 through the opening 201. The second substrate 200 is formed with a ring-like recess 202 along the opening 201. A size of an outer periphery of the ring-like recess 202 is substantially the same as the predetermined circle c. Gaps 204 are formed between the four beams 102a to 102d of the first substrate 100 and the ring-like recess 202 of the second substrate 200.

Figure 6A:
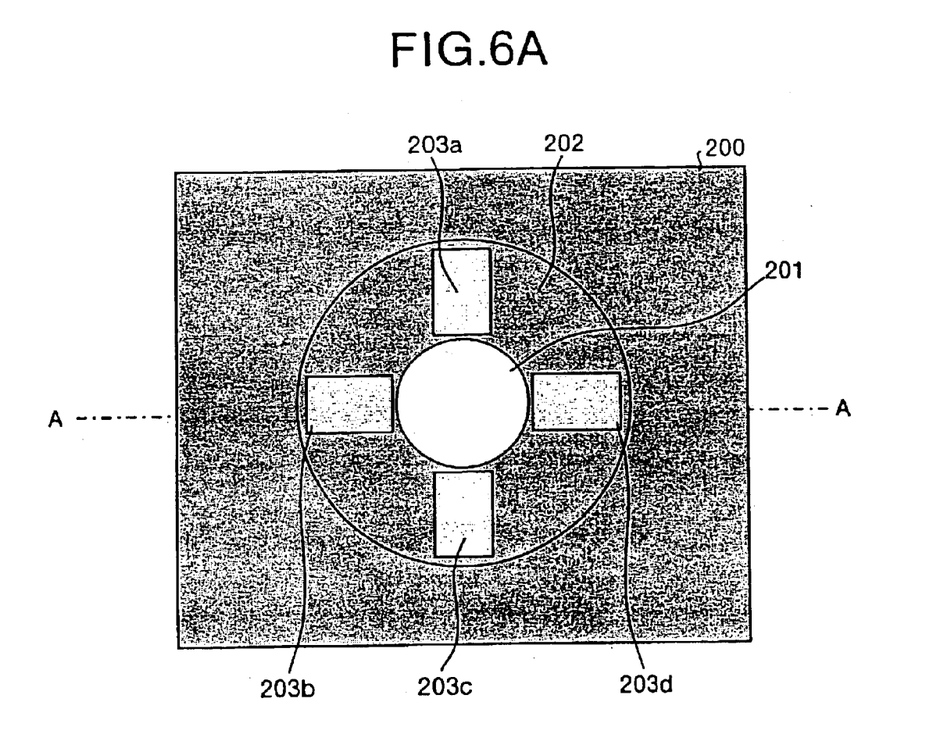
FIGS. 6A and 6B are views showing a second substrate formed with the opening and the electrode.
Figure 6B:
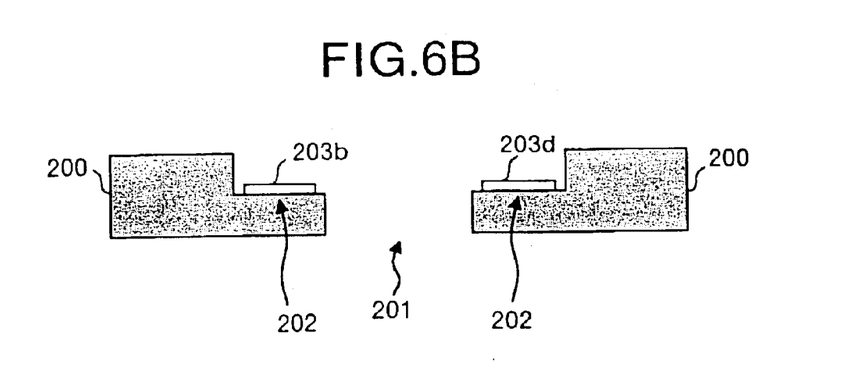

The ring-like recess 202 is formed with four electrodes (second electrodes) 203a to 203d at its locations opposed to the beams 102a to 102d through the gaps 204 (electrodes 203a and 203c are shown in FIGS. 6A and 6B). A reference numeral 250 represents a voltage control circuit which applies voltage between the electrodes formed on the four beams 102a to 102d and the four electrodes 203a to 203d of the second substrate 200, thereby applying electrostatic force to the four beams 102a to 102d. If the voltage is applied between the electrodes formed on the beams 102a to 102d and the electrodes 203a to 203d by the voltage control circuit 250, the beams 102a to 102d are bent by the electrostatic force. If the beams 102a to 102d are independently bent, it is possible to arbitrarily control the tilting direction of the lens 101 due to relation of mechanics. The voltage control circuit 250 controls the tilting direction of the lens 101 in an arbitrary direction by bending the beams 102a to 102d independently. The voltage control circuit 250 may be provided on the second substrate 200.

Figure 2:
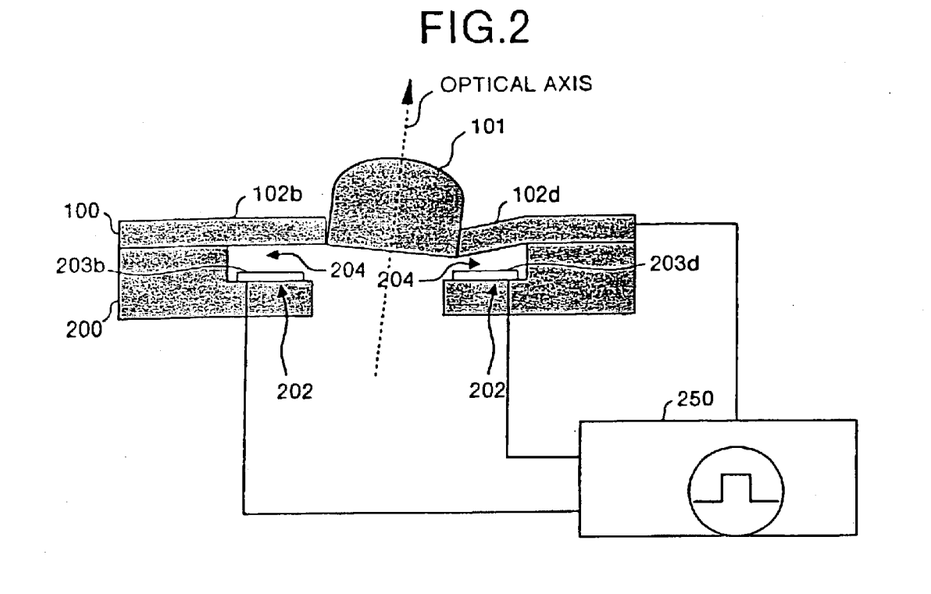
FIG. 2 is an explanatory view for explaining a case in which beams are bent to change a tilting direction of the lens.

Next, a case in which the beams are bent to change the tilting direction of the lens 101 will be explained with reference to FIGS. 1A, 1B and FIG. 2. FIG. 2 is an explanatory view for explaining a case in which the beams are bent to change the tilting direction of the lens 101.

In FIGS. 1A and 1B, the electrostatic force is not applied to any of the beams 102a to 102d, and the optical axis of the lens 101 is perpendicular to the first substrate 100. Here, in the voltage control circuit 250, if voltage is applied between the electrode of the beam 102d and the electrode 203d opposed to the beam 102d through the gap 204, electrostatic force is applied between the beam (including the electrode) 102d and the electrode 203d, and the beam 102d is bent such as to be attracted by the electrode 203d as shown in FIG. 2. With this, the tilting direction of the lens 101 is directed as shown in FIG. 2, and the optical axis of the lens 101 is also changed. That is, if one of the four beams 102a to 102d fixing the lens 101 is bent, the optical axis of the lens 101 is tilted toward the beam 102d. In this manner, if the electrostatic force is applied to the beams 102a to 102d which fix the lens 101, it is possible to tilt the optical axis of the lens in an arbitrary direction.

Next, materials and forming method and the like of the various portions of the tilting device for the lens in FIGS. 1A and 1B will be explained. As the lens 101, various lenses such as a convex lens, a concave lens and an aspherical lens can be used. The lens 101, the beams 102a to 102d and the first substrate 100 may be integrally formed using the same material as shown in FIGS. 1A and 1B, or the lens 101, the beams 102a to 102d and the first substrate 100 may separately be formed and then assembled into one structure. Especially when a diameter of the lens is very small (micro lens), it is preferable to integrally form these elements using micro-machining method as in the former case.

The material and size of each of the beams 102a to 102d are determined by size and weight of the lens fixed by the beams, a tilting range, and magnitude of voltage applied for generating the electrostatic force. The number of beams may be determined by the tilting range, but it is necessary that the number is at least three. Electrodes formed on the beams may be formed separately for each beam, but if the electrode on the side of the beam is used as a ground, an electrode which is common to these beams may be formed.

As the electrodes formed on the beams 102a to 102d, a metal material may widely be used. When the beams 102a to 102d are formed of semiconductor material, impurities may be implanted and dispersed to reduce resistance, and the beam itself may be formed as an electrode.

As material of each of the electrodes 203a to 203d, various materials such as glass, metal and semiconductor may be used. Metal material may widely be used as the material of the electrode like the beam, but if semiconductor material such as silicon is used for the second substrate 200, different conductive impurities may be dispersed and an electrode may be formed by positive/negative connection.

Figure 3A:
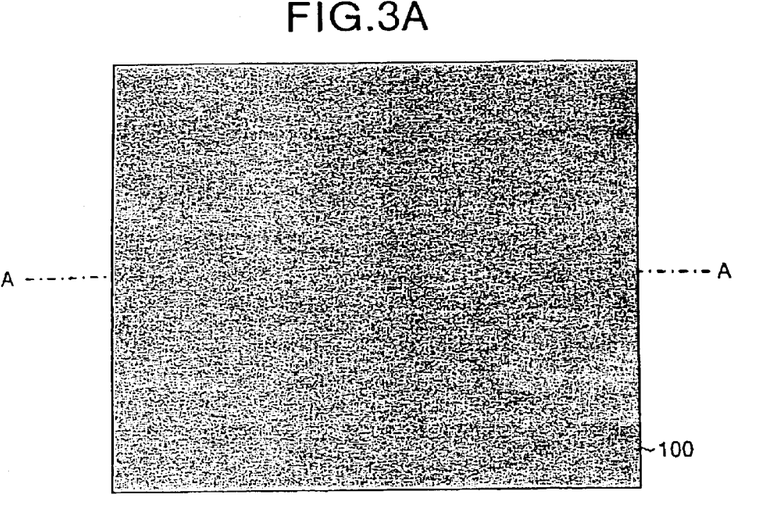
FIGS. 3A and 3B are views showing a first substrate forming the lens and the beams.
Figure 3B:
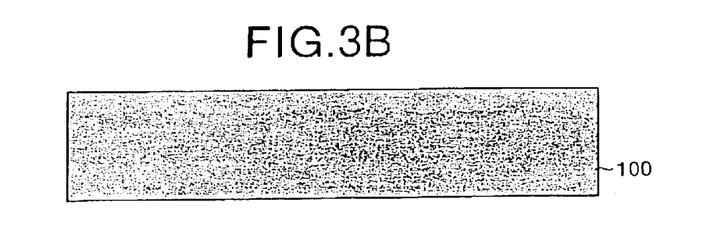
Figure 4A:
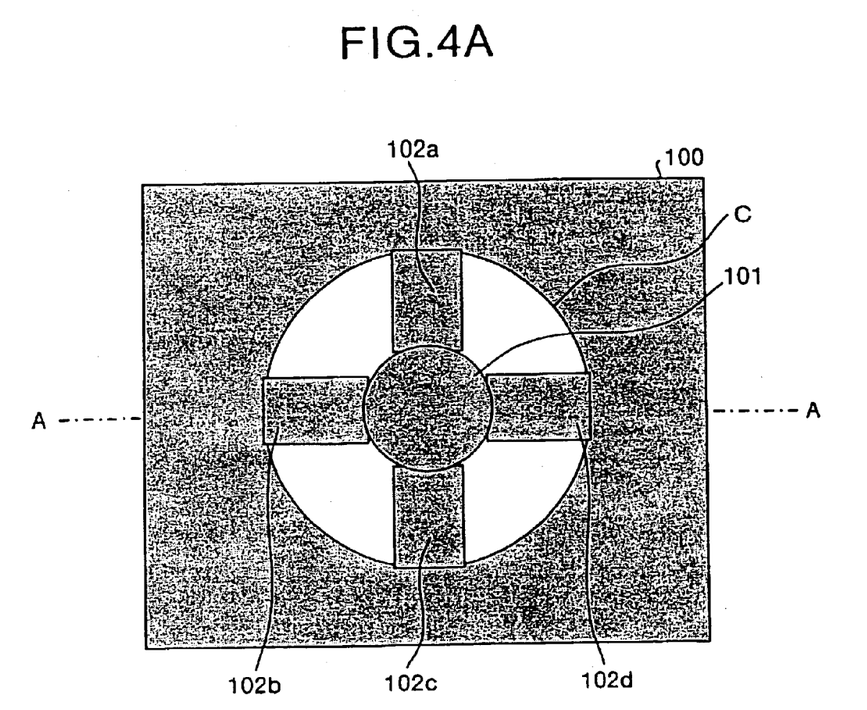
FIGS. 4A and 4B are views showing the first substrate formed with the lens and the beams.

Next, a producing method of the tilting device for the lens shown in FIGS. 1A and 1B will be explained with reference to FIGS. 3 to 8. FIG. 3A is a plan view of the first substrate 100 forming the lens 101 and the beams 102a to 102d, and FIG. 3B is a sectional view taken along A—A line in FIG. 3A. FIG. 4A is a plan view of the first substrate 100 formed with the s101 and the beams 102a to 102d, and FIG. 4B is a sectional view taken along A—A line in FIG. 4A.

In FIGS. 3A and 3B, the reference numeral 100 represents the first substrate for integrally forming the lens 101 and the beams 102a to 102d. As material of the first substrate 100, if a lens 101 in ultraviolet region to visible region is used, optical glass or quartz glass is used, and if a lens 101 in infrared region is used, semiconductor material is used.

Figure 4B:
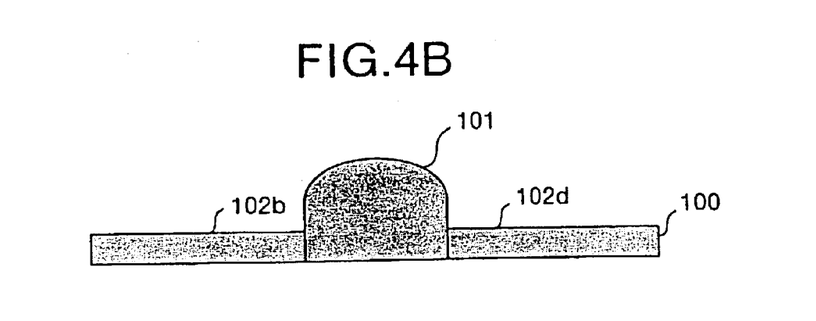

The first substrate 100 shown in FIGS. 3A and 3B are subjected to working using technique of photolithography and dry etching, thereby forming the lens 101 and the beams 102a to 102d shown in FIGS. 4A and 4B. Here, if a photomask formed with pattern of area gray or thermal deforming method is used, it is possible to form a lens, a beam (see FIGS. 9A and 9B) whose passing shape or thickness thereof is changed. Electrodes (not shown) are formed on the beams 102a to 102d so that voltage can be applied. It is also possible to form the beams 102a to 102d using conductive material or semiconductor material, and to form the beam itself as an electrode. It is also possible to form the beams 102a to 102d of conductive material or semiconductor material, and to use the beam itself as an electrode.

Figure 5A:
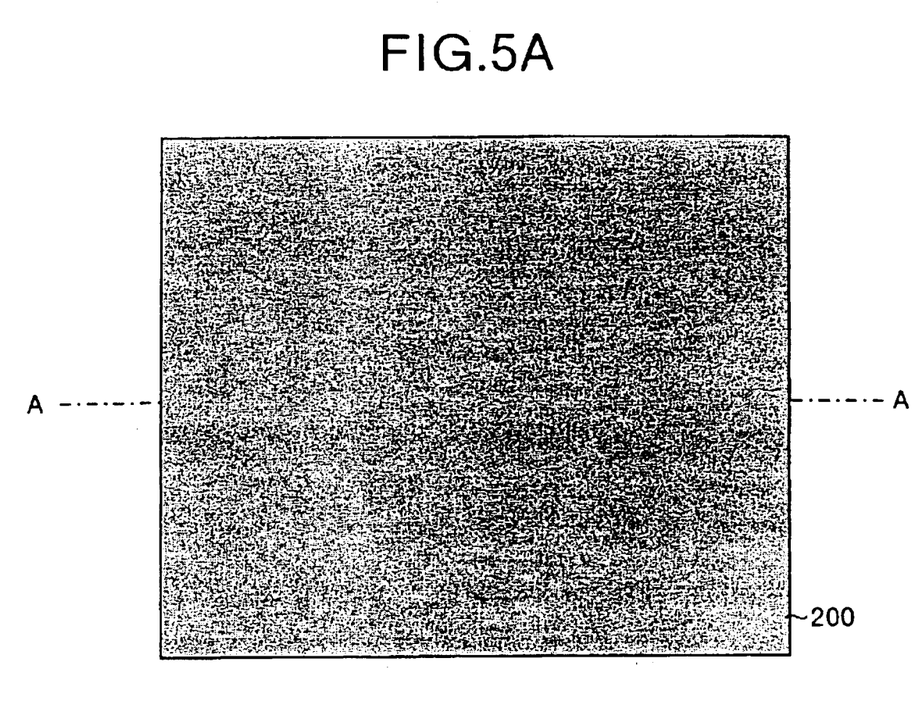
FIGS. 5A and 5B are views showing a second substrate formed with an opening and an electrode.
Figure 5B:
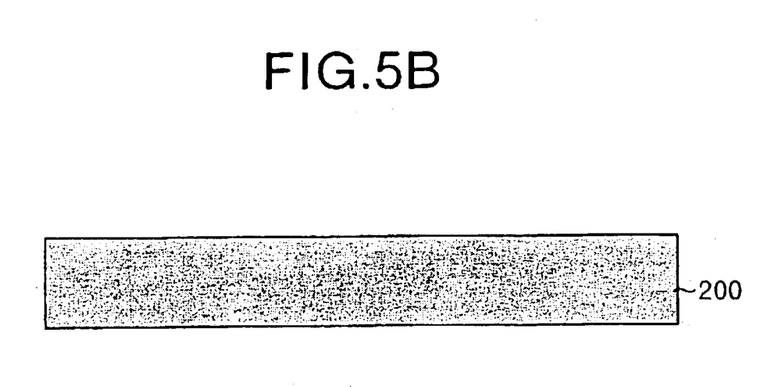

FIG. 5A is a plan view of the second substrate 200 formed with the opening 201 and the electrodes 203a to 203d, and FIG. 5B is a sectional view taken along A—A line in FIG. 5A. FIG. 6A is a plan view of the second substrate 200 formed with the opening 201 and the electrodes 203a to 203d, and FIG. 6B is a sectional view taken along A—A line in FIG. 6A.

In FIGS. 5A and 5B, the reference numeral 200 represents the second substrate for forming the opening 201 and the electrodes 203a to 203d. As a material of the second substrate 200, a transparent glass, a semiconductor material such as a silicon, and a ceramic material can be used.

The second substrate 200 shown in FIGS. 5A and 5B are formed with the circular opening 201 which serves as an optical path to the lens 101. The opening 201 can be formed by dry etching. If the substrate is made of silicon, anisotropic etching may be used using potassium hydroxide solution. Using photolithography and dry etching, the ring-like recess 202 is formed on the periphery of the opening 201. This ring-like recess 202 is for forming the gap 204 between the beams 102a to 102d. If a photomask formed with area gray pattern or thermal deforming method of resist material, it is possible to form a recess (see FIGS. 9A and 9B) which is not parallel to the beam formed on the substrate.

The electrodes 203a to 203d shown in FIGS. 6A and 6B are formed on the ring-like recess 202 of the second substrate 200 at locations opposed to the four beams 102a to 102d of the first substrate 100. As a material of each of the electrodes 203a to 203d, metal can widely be used, but if the second substrate 200 is made of semiconductor material such as silicon, impurities may be implanted and dispersed to form positive/negative connection, thereby forming the electrode region.

Figure 7A:
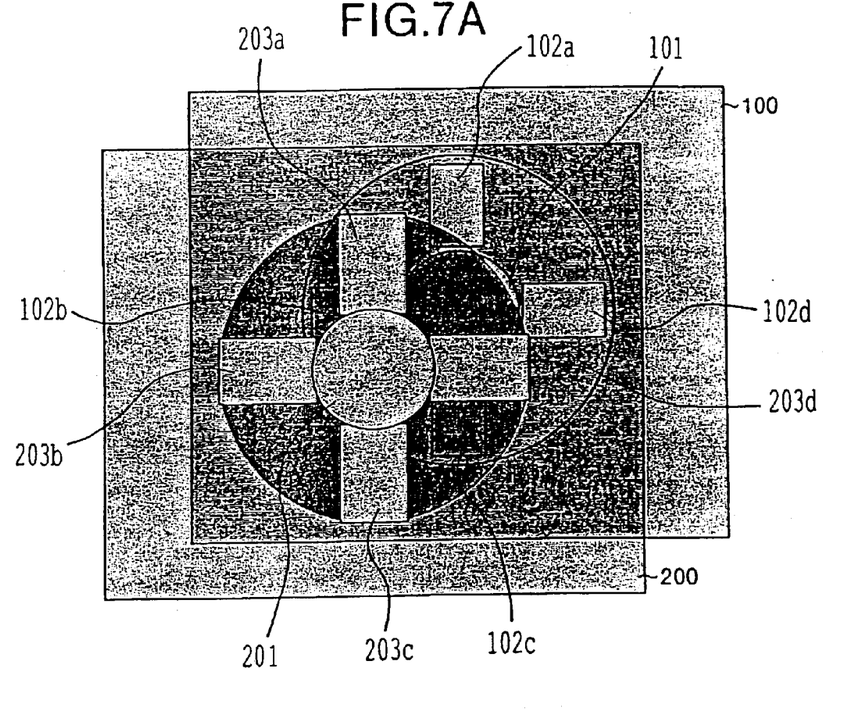
FIGS. 7A and 7B are views for explaining a case in which the first substrate and the second substrate are connected to each other.
Figure 7B:
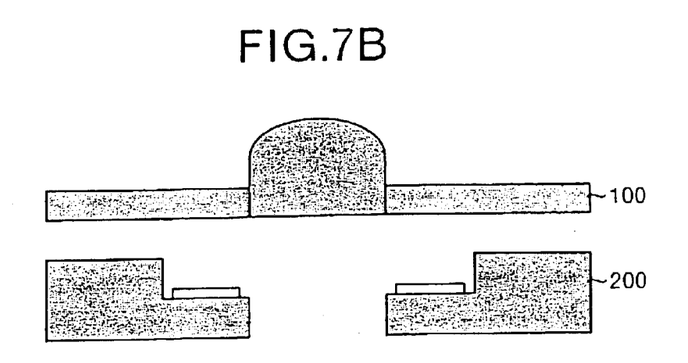
Figure 8A:
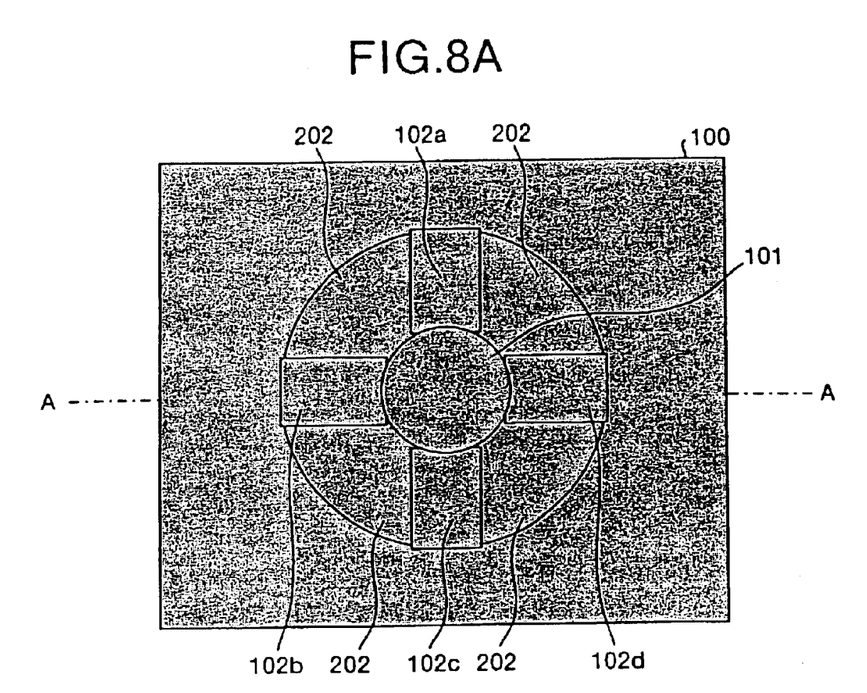
FIGS. 8A and 8B are views showing a completed tilting device for the lens.
Figure 8B:
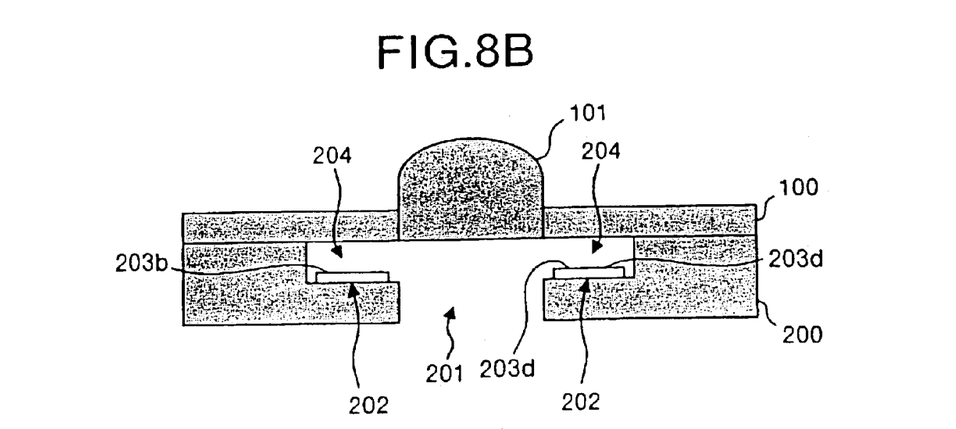

Lastly, as shown in FIGS. 7A and 7B, a lower surface of the first substrate 100 formed with the lens 101 and the beams 102a to 102d shown in FIGS. 4A and 4B and an upper surface of the second substrate 200 formed with the opening 201 and the electrodes 203a to 203d are connected to each other using adhesive. Direct connection or positive connection method using no adhesive interposed between the two substrates may be used. FIGS. 8A and 8B shows the completed lens tilting device.

As explained above, according to the first embodiment, since the optical axis of the lens 101 is moved by the beams 102a to 102d which are bent by the electrostatic force, it is possible to provide a light-weighted tilting device for a lens with small number of parts.

Further, in the first embodiment, at least three beams which are bent by the electrostatic force are used, it is possible to provide a precise tilting device for a lens.

According to the first embodiment, the electrostatic force applied to the beam is formed by the electrode and the gap, the number of parts of the tilting device can be reduced.

According to the first embodiment, since the lens and the beam are made of the same material, it is possible to shorten the producing procedure.

According to the first embodiment, since the first substrate formed with the first electrode and the second substrate formed with the second electrode are joined and connected to each other, it is possible to shorten the producing procedure.

According to the first embodiment, since the second substrate is made of semiconductor material, anisotropic etching can be used, the producing costs can be reduced.

Figure 9A:
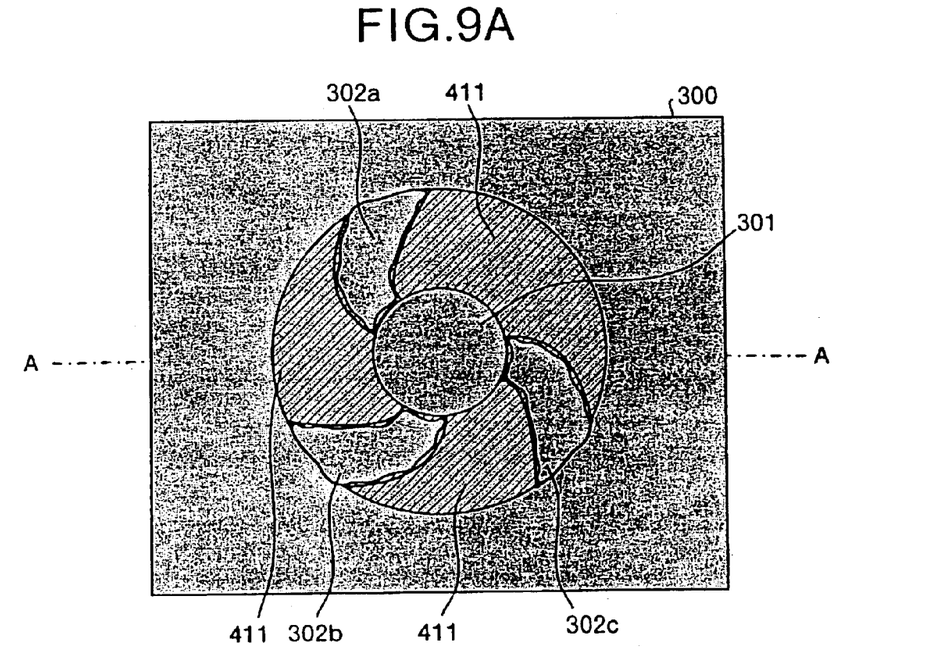
FIGS. 9A and 9B are views showing a schematic structure of a tilting device for a lens according to a second embodiment.
Figure 9B:
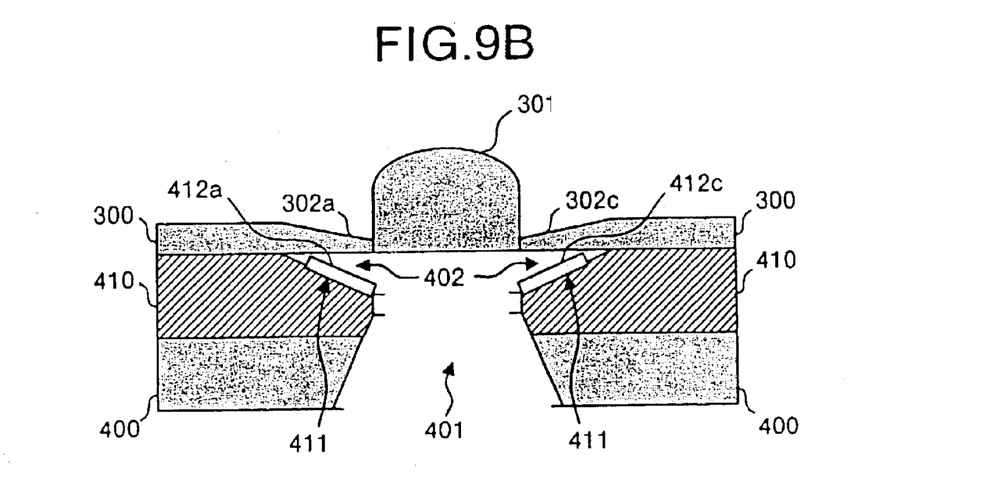

FIGS. 9A and 9B shows a schematic structure of a tilting device for a lens according to the second embodiment, wherein. FIG. 9A is a plan view of the tilting device for the lens of the second embodiment, and FIG. 9B is a sectional view of the tilting device for the lens of the second embodiment. In the tilting device for the lens of the second embodiment, the number of beams is three, and the beam is helical in shape.

In FIGS. 9A and 9B, a reference numeral 300 represents a first substrate formed with a lens 301 and beams 302a to 302c. A reference numeral 301 represents a lens formed at a substantially central portion of the first substrate 300. The reference numerals 302a to 302c represent the three beams supporting the lens 301 from three directions along a predetermined circle of the first substrate 300. The three beams 302a to 302c are formed helically along the lens 301. Each of the three beams 302a to 302c is formed such that a thickness thereof is thicker toward the first substrate 300 (outer side) and is thinner toward the lens 301, and such that a width thereof is wide toward the first substrate 300 (outer side) and is narrow toward the lens 301. Each of the beams 302a to 302c is formed with an electrode (first electrode) which is not shown.

A reference numeral 400 represents a second substrate formed with electrodes 412a to 412c. The second substrate 400 is formed with a semi-conical opening 401. A reference numeral 410 represents a thermal oxidation film 410 formed on the second substrate 400. The thermal oxidation film 410 includes a circular opening, and a slant portion 411 is formed above the opening along a periphery of the opening. A lower surface of the first substrate 300 and an upper surface of the thermal oxidation film 410 are connected to each other through adhesive or the like. A gap 402 is formed between the beams 302a to 302c of the first substrate 300 and the slant portion 411 of the thermal oxidation film 410.

The electrodes (second electrodes) 412a to 412c are formed on the slant portion 411 of the f400 at locations opposed to the three beams 302a to 302c through the gaps 402. A power supply control circuit (not shown) applies voltage between the electrodes formed on the three beams 302a to 302c (302b is not shown) and the three electrodes 412a to 412c of the second substrate 400, thereby applying the electrostatic force to the three beams 302a to 302c. If voltage is applied by the voltage control circuit between the electrodes formed on the beams 302a to 302c and the electrodes 412a to 412c, the beams 302a to 302c are bent by the electrostatic force. If the beams 302a to 302c are independently bent, it is possible to control the tilting direction of the lens 301 due to relation of mechanics. The voltage control circuit (not shown) controls the tilting direction of the lens 301 in an arbitrary direction by bending the beams 302a to 302d independently. The voltage control circuit may be provided on the second substrate 400.

In the tilting device for the lens having the above structure, since the gaps 402 between the beams 302a to 302c and the electrodes 412a to 412c are formed not in parallel to each other, if voltage is applied between the electrodes 412a to 412c and the beams 302a to 302c (including electrode), the beam starts bending from its portion having narrow gap. Therefore, it is possible to bend the beams 302a to 302c with lower voltage.

Further, since the beams 302a to 302c are formed helically along the lens 301, the beam can be made longer and the movable range of the beam can be widened as compared with a case in which the beams 302a to 302c are formed straightly. Therefore, the tilting range of the lens 301 can be widened. Furthermore, since each of the beams 412a to 412c is set such that a thickness thereof is thicker toward the first substrate 300 (outer side) and is thinner toward the lens 301, the bending amount of the thick portion of the beam can be increased by the electrostatic force, and the tilting range of the lens can be widened. Further, since each of the beams 302a to 302c is formed such that a width thereof is wide toward the first substrate 300 (outer side) and is narrow toward the lens 301, it is possible to tilt the lens 301 with low voltage.

The present invention should not be limited to the above embodiments, and the invention can be modified within a range not departing from the subject matter of the invention. For example, an optical portion in the tilting device and its producing method of the first and second embodiments is a lens, but the invention is not limited to this, and the invention can be applied to various optical parts which need a tilting device such as a mirror or a prism.

As explained above, the first aspect provides a tilting device for a lens for tilting a lens formed of optical material, comprising a plurality of beams for supporting the lens, and electrostatic force applying unit which applies electrostatic force to the plurality of beams, wherein the electrostatic force is applied to the plurality of beams to bend the beam, thereby tilting the lens. Therefore, it is possible to provide a light-weighted tilting device for a lens having a simple structure.

According to the second aspect, in the first aspect, the number of the plurality of beams is three or more. According to this aspect, three or more beams are formed. Therefore, in addition to the effect of the first aspect, it is possible to provide a tilting device having high precision.

According to the third aspect, in the first aspect, the plurality of beams are formed helically. With this aspect, the plurality of beams are formed helically. Therefore, in addition to the effect of the first or second aspect, the length of the beam can be increased, and the tilting range can be widened.

According to the fourth aspect, in any of the first to third aspects, a portion of each of the plurality of beams is that supports the lens is formed narrower. With this aspect, the portion of each of the plurality of beams is that supports the lens is formed narrower. Therefore, in addition to the effect of any one of the first to third aspects, the lens can be tilted with low voltage.

According to the fifth aspect, in any of the first to fourth aspects, a portion of each of the plurality of beams is that supports the lens is formed thinner. With this aspect, the portion of each of the plurality of beams is that supports the lens is formed thinner. Therefore, in addition to the effect of any one of the first to fourth aspects, the lens can be tilted with lower voltage.

According to the sixth aspect, in any of the first to fifth aspects, the electrostatic force applying unit comprises a first electrode formed on each the beam, a second electrode formed at a location opposed to each the beams through a gap, and voltage applying unit which applies voltage between the first electrode formed on the beam and the second electrode to apply the electrostatic force to the beam. With this aspect, voltage applying unit applies voltage between the first electrode formed on the beam and the second electrode formed such as to be opposed to the first electrode through a gap to apply the electrostatic force to the beam. Therefore, in addition to the effect of anyone of the first to fifth aspects, the electrostatic force applied to the beam can be formed by the electrode and the gap, and it is possible to provide a tilting device for a lens with small number of parts.

According to the seventh aspect, in the sixth aspect, the gaps are not parallel to each other. With this aspect, the gaps are not parallel to each other. Therefore, in addition to the effect of the sixth aspect, the beam can be bent with low voltage.

According to the eighth aspect, in any of the first to seventh aspects, the lens and the plurality of beams are made of the same material. With this aspect, the lens and the plurality of beams are made of the same material. Therefore, in addition to the effect of any one of the first to seventh aspects, the producing procedure can be simplified, and the producing procedure can be shortened.

According to the ninth aspect, in any of the sixth to eighth aspects, the lens, the plurality of beams, a first substrate formed with the first electrode and a second substrate formed with the second electrode are connected to one another. With this aspect, the lens, the plurality of beams, a first substrate formed with the first electrode and a second substrate formed with the second electrode are connected to one another. Therefore, in addition to the effect of any one of the sixth to eighth aspects, the producing procedure can further be shortened.

According to the tenth aspect, in the ninth aspect, the second substrate is a semiconductor material. With this aspect, the second substrate is a semiconductor material. Therefore, in addition to the effect of the ninth aspect, the second substrate can be worked using anisotropic etching, and the producing costs can be reduced.

According to the eleventh aspect, in the ninth or tenth aspect, the second substrate is provided with the voltage applying unit. With this aspect, the second substrate is provided with the voltage applying unit. Therefore, in addition to the effect of the ninth or tenth aspect, the tilting device for a lens can be made compact, and signal delay of voltage applied from the voltage applying unit to the electrode can be reduced.

The present document incorporates by reference the entire contents of Japanese priority document, 2000-356639 filed in Japan on Nov. 22, 2000.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed:

1. A floating type optical head, comprising:
   a tilting device configured to tilt a lens formed of optical material, comprising:
   a plurality of beams for supporting said lens, and
   an electrostatic force applying unit that applies an electrostatic force to said plurality of beams,
   wherein the electrostatic force is applied to said plurality of beams to bend said plurality of beams, thereby tilting said lens,
   wherein a first portion of each of said plurality of beams that supports said lens is formed thinner than a second portion of each of said plurality of beams, and
   wherein the electrostatic force applying unit includes a first electrode formed on each of the beams and a second electrode formed at a location opposed to each of the beams through a gap.

2. A floating type optical head according to claim 1, wherein the number of said plurality of beams is at least three.

3. A floating type optical head according to claim 1, wherein said plurality of beams are formed helically.

4. A floating type optical head according to claim 1, wherein each of said plurality of beams that supports said lens includes a narrower portion.

5. A floating type optical head according to claim 1, wherein said electrostatic force applying unit further includes:
   a voltage applying unit configured to apply voltage between said first electrode formed on each of the beams and the second electrode to apply the electrostatic force to each of the beams.

6. A floating type optical head according to claim 5, wherein said gaps are not parallel to each other.

7. A floating type optical head according to claim 1, wherein said lens and said plurality of beams are made of a same material.

8. A floating type optical head according to claim 5, wherein said lens, said plurality of beams, a first substrate formed with said first electrode, and a second substrate formed with said second electrode are connected to one another.

9. A floating type optical head according to claim 8, wherein said second substrate includes a semiconductor material.

10. A floating type optical head according to claim 8, wherein said second substrate includes said voltage applying unit.

11. A floating type optical head, comprising:
    a tilting device configured to tilt a lens formed of an optical material, comprising:
    a plurality of beams for supporting said lens, and
    an electrostatic force applying unit that applies an electrostatic force to said plurality of beams,
    wherein the electrostatic force is applied to said plurality of beams to bend said plurality of beams, thereby tilting said lens,
    wherein said electrostatic force applying unit comprises:
    a first electrode formed on each of the beams,
    a second electrode formed at a location opposed to each of the beams through a gap, and
    a voltage applying unit configured to apply a voltage between said first electrode formed on each of the beams and the second electrode to apply the electrostatic force to each of the beams.

12. A floating type optical head according to claim 11, wherein said gaps are not parallel to each other.

13. A floating type optical head according to claim 11, wherein said lens, said plurality of beams, a first substrate formed with said first electrode, and a second substrate formed with said second electrode are connected to one another.

14. A floating type optical head according to claim 13, wherein said second substrate includes a semiconductor material.

15. A floating type optical head according to claim 13, wherein said second substrate includes said voltage applying unit.

16. A floating type optical head, comprising:
    a tilting device configured to tilt a lens formed of optical material, comprising:
    a plurality of beams for supporting said lens, and
    an electrostatic force applying unit that applies an electrostatic force to said plurality of beams,
    wherein the electrostatic force is applied to said plurality of beams to bend said plurality of beams, thereby tilting said lens,
    wherein said electrostatic force applying unit comprises:
    a first electrode formed on each of the beams, and
    a second electrode formed at a location opposed to each of the beams through a gap.

17. A floating optical type head according to claim 16, wherein said gaps are not parallel to each other.

18. A floating optical type head according to claim 16, wherein said lens, said plurality of beams, a first substrate formed with said first electrode, and a second substrate formed with said second electrode are connected to one another.

19. A floating type optical head according to claim 18, wherein said second substrate includes a semiconductor material.

20. A floating type optical head according to claim 18, wherein said second substrate includes a voltage applying unit.

21. An optical disk drive, comprising:
   a floating type optical head, comprising:
      a tilting device for a lens configured to tilt a lens formed of optical material, comprising:
         a plurality of beams for supporting said lens, and
         an electrostatic force applying unit that applies an electrostatic force to said plurality of beams,
         wherein the electrostatic force is applied to said plurality of beams to bend said plurality of beams, thereby tilting said lens,
         wherein a first portion of each of said plurality of beams that supports said lens is formed thinner than a second portion of each of said plurality of beams, and
         wherein the electrostatic force applying unit includes a first electrode formed on each of the beams and a second electrode formed at a location opposed to each of the beams through a gap.

22. An optical disk drive according to claim 21, wherein the number of said plurality of beams is at least three.

23. An optical disk drive according to claim 21, wherein said plurality of beams are formed helically.

24. An optical disk drive according to claim 21, wherein each of said plurality of beams that supports said lens includes a narrower portion.

25. An optical disk drive according to claim 21, wherein said electrostatic force applying unit further includes:
   a voltage applying unit configured to apply voltage between said first electrode formed on each of the beams and the second electrode to apply the electrostatic force to each of the beams.

26. An optical disk drive according to claim 25, wherein said gaps are not parallel to each other.

27. An optical disk drive according to claim 21, wherein said lens and said plurality of beams are made of a same material.

28. An optical disk drive according to claim 25, wherein said lens, said plurality of beams, a first substrate formed with said first electrode, and a second substrate formed with said second electrode are connected to one another.

29. An optical disk drive according to claim 28, wherein said second substrate includes a semiconductor material.

30. An optical disk drive according to claim 28, wherein said second substrate includes said voltage applying unit.

31. An optical disk drive, comprising:
   a floating type optical head, comprising:
      a tilting device for a lens configured to tilt a lens formed of optical material and comprising:
         a plurality of beams for supporting said lens, and
         an electrostatic force applying unit that applies an electrostatic force to said plurality of beams,
         wherein the electrostatic force is applied to said plurality of beams to bend said plurality of beams, thereby tilting said lens,
         wherein said electrostatic force applying unit comprises:
            a first electrode formed on each of the beams,
            a second electrode formed at a location opposed to each of the beams through a gap, and
            a voltage applying unit configured to apply a voltage between said first electrode formed on each of the beams and the second electrode to apply the electrostatic force to each of the beams.

32. An optical disk drive according to claim 21, wherein said gaps are not parallel to each other.

33. An optical disk drive according to claim 21, wherein said lens, said plurality of beams, a first substrate formed with said first electrode, and a second substrate formed with said second electrode are connected to one another.

34. An optical disk drive according to claim 33, wherein said second substrate includes a semiconductor material.

35. An optical disk drive according to claim 33, wherein said second substrate includes said voltage applying unit.

36. An optical disk drive, comprising:
   a floating type optical head, comprising:
      a tilting device for a lens configured to tilt a lens formed of optical material and comprising:
         a plurality of beams for supporting said lens, and
         an electrostatic force applying unit that applies an electrostatic force to said plurality of beams,
         wherein the electrostatic force is applied to said plurality of beams to bend said plurality of beams, thereby tilting said lens,
         wherein said electrostatic force applying unit comprises:
            a first electrode formed on each of the beams, and
            a second electrode formed at a location opposed to each of the beams through a gap.

37. An optical disk drive according to claim 36, wherein said gaps are not parallel to each other.

38. An optical disk drive according to claim 36, wherein said lens, said plurality of beams, a first substrate formed with said first electrode, and a second substrate formed with said second electrode are connected to one another.

39. An optical disk drive according to claim 38, wherein said second substrate includes a semiconductor material.

40. An optical disk drive according to claim 38, wherein said second substrate includes a voltage applying unit.

* * * * *